US006169266B1

(12) United States Patent
Hughes

(10) Patent No.: US 6,169,266 B1
(45) Date of Patent: Jan. 2, 2001

(54) ETCHING OF MULTI-LAYERED COATED SURFACES TO ADD GRAPHIC AND TEXT ELEMENTS TO AN ARTICLE

(75) Inventor: James G. Hughes, Simi Valley, CA (US)

(73) Assignee: Xirom, Inc., Thousand Oaks, CA (US)

( * ) Notice: Under 35 U.S.C. 154(b), the term of this patent shall be extended for 0 days.

(21) Appl. No.: 09/048,017

(22) Filed: Mar. 25, 1998

(51) Int. Cl.[7] .......... B23K 26/38

(52) U.S. Cl. .......... 219/121.68; 219/121.69; 219/121.7; 219/121.71; 427/555

(58) Field of Search .......... 427/554, 555, 427/556; 219/121.69, 121.85, 121.68, 121.67, 121.7, 121.71

(56) References Cited

U.S. PATENT DOCUMENTS 4,323,755 * 4/1982 Nierenberg .......... 219/121.69
4,727,235 * 2/1988 Stamer et al. .......... 219/121.68
4,877,480 * 10/1989 Das .......... 219/121.67
4,970,600 11/1990 Garnier et al. .
5,061,341 * 10/1991 Kildal et al. .......... 219/121.69
5,338,396 8/1994 Abdala et al. .
5,460,757 * 10/1995 Hedgecoth .......... 219/121.69
5,477,023 12/1995 Schneider et al. .
5,603,796 2/1997 Baker .
6,007,929 * 12/1999 Robertson et al. .

FOREIGN PATENT DOCUMENTS 41 34 271 12/1992 (DE) .
44 19 197 12/1994 (DE) .
0 383 956 8/1990 (EP) .
0 771 677 5/1997 (EP) .
0 802 064 10/1997 (EP) .
2 575 114 A 6/1985 (FR) .
2575115 6/1985 (FR) .
59-14993 * 1/1984 (JP) .......... 427/555
60-261573 * 12/1985 (JP) .......... 427/555
63 205291 8/1988 (JP) .
63-209889 * 8/1988 (JP) .
1 267092 10/1989 (JP) .

OTHER PUBLICATIONS

W. Numberger, "Strichcodes Individuell und Rationell Geschriben", *Laser Praxis*, No. 1, Jun. 1990, pp. IS48–LS50.

H.C. Bader et al., "Faseroptik Fuhrt Laserstrahl beim Beschrifen", *Laser Praxis*, Oct. 1990, pp. LS120–LS122.

* cited by examiner

*Primary Examiner*—Geoffrey S. Evans
(74) *Attorney, Agent, or Firm*—Lyon, Harr & Defrank; Richard T. Lyon

(57) ABSTRACT

A system and method for incorporating graphic and text elements on a surface of an article by employing an ablative etching device, such as a laser etcher, that is capable of etching the elements into a coating on the article's surface having at least two layers of material. The ablative etching device etches into the coating layers to a depth that removes the material of the outermost, exposed layer, but which leaves intact at least a portion of the depth of an underlying layer. As a result the graphics and text take on the color of the particular underlying layer exposed by the etching process. By making the colors of the underlying layer or layers contrast the color of the outermost, exposed layer, the graphics and text elements become readily readable against the background color of the outermost layer. Further, the graphic and text elements can be formed as an array having individual holes etched into the coating layers, as well as un-etched locations. By alternating the color exhibited by adjacent locations in the array, it can be made to appear to a viewer that the associated graphic and text elements are a color different from the colors actually exhibited by the adjacent array locations. The shade of the color associated with a portion of the graphic and text elements can also be made to appear lighter or darker to a viewer.

34 Claims, 2 Drawing Sheets

ETCHING OF MULTI-LAYERED COATED SURFACES TO ADD GRAPHIC AND TEXT ELEMENTS TO AN ARTICLE

BACKGROUND OF THE INVENTION

1. Technical Field

This invention relates to a system and method of incorporating graphic and text elements on a surface of an article, and particularly to such a system and method that incorporates the graphic and text elements via etching of a multi-layered coated surface of the article.

2. Background Art

The marking of products using both graphics and text is a common process employed by almost every manufacturer. This marking is used to provide a user with information related to brand names, product specifications, safety warnings, and much more. One common method of marking products is to adhere a pre-printed label having the desired information onto an appropriate surface of the product. Another common method involves painting or inking the information onto a surface of the product using a direct printing process, such as screen process printing (often referred to as silk-screening), pad printing, or some form of lithographic printing. While these latter processes for directly printing information on a product vary greatly in their details, all involve the use of a reusable component that contains the graphics and text to be printed on the product. For example, screen process printing employs a screen having mesh covered openings in the configuration of the desired graphics and text. The screen is placed on the surface to be printed and paint or ink is forced through the mesh covered openings to form the graphics and text on the article.

Both labeling and direct printing processes work well in many applications, but there are drawbacks. For example, labels can be susceptible to peeling or unauthorized removal. In addition, both labels and topically applied painted or inked markings are susceptible to damage and wear. Further, aligning and placing a label on a product or printing markings on a product can be very labor intensive if done by hand, as is often the case.

Another issue concerning the use of labels or the aforementioned direct printing processes to mark products is related to the current trend toward miniaturization, especially of electronic components. As these components get smaller and smaller, the information being marked on the product must fit in an increasingly smaller area. In addition, the amount of information that needs to be displayed on some electronic components is considerable. For example, a PC Card modem used in conjunction with portable or notebook-type personal computers often requires that registration numbers and approval markings of several countries to be placed on the Card's exterior, along with a variety of other information such as safety warnings, patent designations, and bar coding. Placing so much information in such a small area presents a problem for most types of printed labels and direct printing processes, as they cannot provide the resolution necessary to make the graphics and lettering small enough to fit in the aforementioned shrinking areas and still make them recognizable and readable. This resolution problem is especially troublesome with regard to bar coding. It can become impossible to accurately scan a bar code that is made as narrow as the industry standard allows if the edge resolution is not sufficient to clearly define the widths and separation of the lines forming the bar code.

There is also a considerable amount of lead time involved in printing labels or preparing the reusable components needed for the previously-described direct printing methods. Labels must be pre-printed and stocked in sufficient quantities to meet production needs. Similarly, the reusable components used in the direct printing processes have to be pre-fabricated. This lead time requirement presents a problem where the information that is to be placed on a product is subject to last-minute changes. Referring to the example of a PC Card modem, the registration and approval information tends to change often, and as the popularity of such devices increases worldwide, more countries are establishing requirements for their own approval marking to be incorporated. Such last minute changes can make existing stocks of labels or a pre-fabricated direct printing component unusable. Not only does this require scraping the existing labels and components, and incurring the attendant costs, but the lead time to obtain replacements can be unacceptable. Typically, new art must be prepared and approved, proofs generated, and finally the labels or direct printing components produced and delivered. It has been the experience of the assignee hereto that this process can take two weeks in many cases. Delays of this type can severely limit a manufacturers time to market capability. Further, the cost to obtain labels or direct printing components is often quite high. This can contribute to an escalation in the cost of a product. Additionally, the high cost to obtain labels or direct printing components can make it uneconomical to produce small lots of a product with custom markings. As a result, potential customers could be lost that the manufacturer would have otherwise been able to supply.

Accordingly, there is a need for a system and method of incorporating graphic and text on a surface of an article that is substantially permanent and wear resistant. In addition, the system and method should produce high resolution, readable graphics and text of very small sizes. And finally, the system and method should allow a user to make changes to the markings almost on a real time basis without the need to scrap old labels and direct printing components, or procure new ones.

SUMMARY OF THE INVENTION

The above-described needs are realized with embodiments of the present invention directed to a system and method for incorporating graphic and text elements on a surface of an article by employing an ablative etching device that is capable of etching the elements into a coating on the article's surface having at least two layers of a material such as paint, ink or the like. The etching device etches into the coating layers to a depth that removes the material of the outermost, exposed layer, but which leaves intact at least a portion of the depth of an underlying layer. As a result the graphics and text take on the color of the particular underlying layer exposed by the etching process. This has considerable advantage when the underlying layer has a color that contrasts the color of the outermost, exposed layer because the graphics and text elements become plainly readable against the contrasting background color of the outermost layer. For example, if the graphics include conventional bar coding, the contrast provided by the layered coating scheme described above facilitates the accurate scanning of the bar codes.

In some embodiments of the present invention, there are just two layers. In another embodiments there are more layers with at least two layers underlying the outermost, exposed layer. Each of these underlying layers has a different color which contrasts that of the outermost layer. In the first embodiment, all the graphics and text will have the same color, i.e. that of the single underlying layer. However, in the embodiment with multiple underlying layers of different colors, the color of the graphic and text elements can vary. This is accomplished by using the etching device to etch down to the underlying layer having the color desired for a particular portion of the graphics and text.

The ablative etching device can take the form of any appropriate apparatus that removes material from the coating layers without making actual contact with the layers. For example, laser etching devices using a laser beam to etch the coating layers is one possibility. In addition, various types of particle beam etching devices, such as those using molecular, ion, electron, or radical beams to etch materials from a surface, could be employed. However, for the purposes of the present invention, a laser etching device is preferred as such devices provide the desired etching resolution, are readily available from commercial sources and are the most practical to operate.

While the ablative etching device chosen can employ a variety of different beam configurations, there is an added advantage to employing one that allows the graphic and text elements to be etched as an array of individual holes cut into the coating layers. For example, a pulse-type laser could be employed for this purpose. The advantage of forming the graphic and text elements as an array of holes revolves around the ability to etch each of the holes down to a different one of the underlying layers. In this way each of the holes can exhibit a different color. Thus, for example, three underlying layers could be formed where each is one of three primary colors—e.g. yellow, magenta and cyan. By alternating the colors exhibited by adjacent holes in all or a portion of the array, it can be made to appear to a viewer that the graphic and text elements are a different color. For example, this apparent color would be red if the adjacent holes alternately exhibited yellow and magenta. Similarly, the apparent color would be green if the adjacent holes exhibited yellow and cyan. And finally, the apparent color would be blue if the adjacent holes exhibited magenta and cyan. Of course, for holes exhibiting two alternating primary colors to impart an apparent color to a portion of the graphic and text elements, the size and density of the holes has to be controlled. It is believed the apparent colors can be produced by making the holes no larger than about 0.005 of an inch in diameter and grouping them in a density no less than about 90,000 holes per square inch.

The shade of the apparent color associated with a portion of the graphic and text elements can also be made to appear lighter or darker to a viewer. This is accomplished by employing a white layer to lighten the shade and a black layer to darken the shade. Generally, the color of a portion of the graphic and text elements is lightened by uniformly intermixing areas exhibiting a white color throughout the array in that portion. Similarly, the color of a portion of the elements can be darkened by uniformly intermixing areas exhibiting a black color throughout the array in the portion. Preferably, these areas of black or white color have a size commensurate with that of the etched holes in the array. The shade is varied by varying the density of the black or white areas. Specifically, the higher the density of white areas, the lighter the shade, and the higher the density of black areas, the darker the shade. The black or white areas can be formed in the array in two different ways. One way is to include a black or white layer, or both, as ones of the aforementioned underlying layers. If so, the black or white areas are formed by using the etching device to etches a hole in the coating layers down to the black or white layer, as appropriate. Alternatively, the overlying, exposed layer can be made to be either black or white. If so, the black or white areas, as the case may be, are formed by refraining from etching a hole into the layers at that spot in the array.

An alternate method of etching the graphic and text elements into the covering layers to produce an apparent color is to completely remove the material of the overlying, exposed layer, as well as any other layer covering the outermost of two prescribed primary color layers to be used in the previously-discussed alternating color pattern. Once the overlying layers are completely removed in a desired portion of the graphic and text elements, an array is formed by etching holes through the exposed primary color layer into the layer associated with the second of the prescribed primary colors. Adjacent array locations are made to alternate between an etched location exhibiting the color of the more underlying prescribed primary color layer and a non-etched location exhibiting the color of the outermost prescribed primary color layer. In this approach any white layer intended for use in lightening the shade of the apparent color, as well as any black layer intended for use in darkening the apparent color, would be formed underneath the primary color layers and intermixed into the array by etching holes to the appropriate one of the layers.

The just-described embodiments of the system and method for incorporating graphic and text elements on the surface of an article resolve the problems of peeling, unauthorized removal and wear associated with conventional labels and direct printing techniques. The markings are permanently etched into a multi-layered coating covering a surface of the article, thereby resisting removal and tampering. In addition, as the markings are not raised above the outermost, exposed layer, they are less susceptible to damage and wear. Further, current ablative etching devices are capable of producing graphics and text having extremely high resolution. This allow the etching of extremely small characters (e.g. character sizes around 0.015 inches tall) which can still be easily read against the contrasting background of the outermost layer. In this way a large amount of information can be provided on very small surfaces—a distinct advantage for marking today's miniaturized electronic products and components. Current computer-controlled ablative etching devices also allow changes to the graphics and text to be input into the computer and immediately viewed on a monitor and/or printout before the etching process begins. This makes it possible to perform last minute changes quickly, and without the need to scrap stockpiled labels or existing direct printing components, and without the added costs associated with replacing these items. Further, since customized graphics and text can be created and etched into the previously described multi-layered coating scheme on almost a real time basis, it is feasible to support small product runs, thereby making the cost to small customers commensurate with other orders.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

Figure 1:
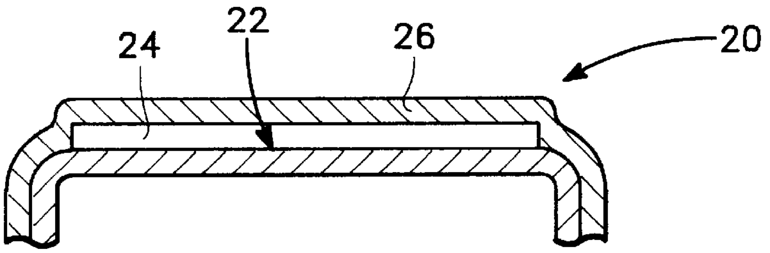
FIG. 1 is a cross-sectional view of a back cover of a PC Card incorporating a two-layer version of the coating scheme embodying the present invention prior to the etching of graphic and text elements into the coating scheme.

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

The preferred embodiments of the present invention employ known etching technology and a unique multi-layered surface coating to add graphics and text to an article. The known etching technology involves apparatuses and methods where an ablative beam is moved in relation to an article so as to etch or engrave marks into its surface. Typically, these etching devices employ one of two general methods to create the desired markings. The first method is known as a raster scan method. In raster scan etching, an ablative beam having a defined beam width is swept horizontally across the surface of the article to be etched. As the beam horizontally scans it is modulated so as to impinge onto the article only in those locations in the scan line that are part of the marking being etched into the surface. After one scan line is complete the etching device moves the beam vertically a distance approximately equal to the aforementioned beam width and the scanning and modulating process is repeated. The horizontal scanning and vertical repositioning steps continue until the desired image is established on the surface of the article.

The other general category of ablative etching devices operate by moving an ablative beam in relation to the article such that the desired markings are traced out on the article's surface. For example, a typical etching device in this category has a computer into which pattern data is input. The pattern data comprises one or more set of two dimensional coordinate information that specify the movements of the ablative beam. The computer controls an X-Y translation apparatus that moves the beam according to the pattern data and additional information provided by a user via a user interface.

The depth the ablative beam etches into the surface of the article in either category of etching devices is directly related to the power of the beam and the speed at which the beam is moved relative to the article (i.e. the length of time the beam impinges on a particular spot). Accordingly, the etching depth can be controlled by controlling the power of the beam and/or the speed at which the beam moves relative to the surface being etched. A depth control apparatus for this purpose is typically incorporated into current ablative etching devices so as to allow the depth of the etching at any spot on the article's surface to be controlled and specified by the user.

The ablative etching device can take the form of a laser etcher that uses a laser beam to etch markings into an article. However, it is not intended that the present invention be limited to such laser etching devices. Rather, other types of ablative etching devices can be employed if desired. For example, various particle beam etchers could be used, such as those employing a molecular, ion, electron, or radical beam to etch materials from a surface. While these other ablative etching devices are acceptable, it is noted that a laser etching device is preferred because these devices can provide the desired etching resolution and are readily available from commercial sources. In addition, it is believed laser etching devices are the most practical to operate. The preferred laser etching device will be referred to in connection with the description of the invention in the remainder of this specification for convenience sake. However, it should be understood that any other appropriate ablative etching device could be substituted without departing from the scope of the present invention.

The use of laser etching processes to mark articles with graphics and text can have a significant advantage over the previously-described labeling and direct printing methods. Since the markings are engraved into the surface of the article, the problems associated with peeling and unauthorized removal of labels is resolved. In addition, as the engravings are not raised above the surface, they are less susceptible to damage and wear. Essentially, it is the un-etched portions of the surface that take the brunt of the wear and tear the article may be subjected to, thereby protecting the actual markings. Further, current laser etching devices are capable of creating extremely high resolution characters. For example, some laser etching devices can create characters having heights of 0.004 inches or less, although for practical purposes (i.e. readability) character heights no less than about 0.015 inches are preferred. The previously-described labels and direct printing processes are not capable of providing these levels of resolution. The ability to create readable characters sizes around 0.015 inches allows a significant amount of information to be placed in a small area. In addition, it is believed that current laser etching devices are capable of producing an edge resolution that will allow the lines used to form linear bar codes on an article to have the minimum spacing and line width allowed by the industry standards, while still remaining highly scanable. Finally, the long lead time problems associated with changing labels or the direct printing components is eliminated with the use of a laser etching device. Current laser etching devices allow a user to input changes to the markings placed on an article with ease in a short amount of time. For example, some current computer-controlled laser etching devices include software that allows a user to input changes into the computer and view the results on a monitor and/or printout before the etching process begins. In this way changes can be made, approved and implemented in a matter of hours rather than days or weeks. Accordingly, last minute changes can be implemented quickly, without the inherent scrapping and replacement costs associated with revising labels or direct printing components. In addition, as modifications to the images etched onto an article can be made almost real time, it is feasible to add custom graphics and text to small product runs, thereby making the cost to small customers commensurate with other orders.

The use of a laser etching device alone to mark a product with desired information, however, is in many cases not feasible. It has been found that the contrast between the etched portion and the non-etched portions of a surface is often not sufficient to facilitate it readability. This contrast problem is particularly troublesome in regards to bar codes etched into a surface. A low contrast between the etched bar codes and the surrounding surface makes it practically impossible to scan the code accurately. For example, in regards to the PC Cards described previously, the back cover is typically used to display the required registration, authorization, and other information. This back cover is typically metal, usually aluminum or stainless steel. It has been found that the contrast between an etched portion of such a metal surface does not exhibit a sufficient contrast when compared to the un-etched surface to facilitate reading the graphics and text, or scanning a bar code. A similar insufficiency in contrast was found when the metal surface was coated with a layer of dark gray paint and then etched.

To overcome the contrast problem, a unique multi-layered surface coating scheme has been developed. This scheme provides the needed contrast, while still reaping the previously-described benefits afforded by using a laser etching process to mark articles. FIG. 1 illustrates one preferred embodiment of the multi-layered surface coating scheme according to the present invention prior to its being etched. Specifically, a cross-section of the back cover 20 of a PC Card is depicted to serve as an example of how the system is employed on a surface of an article. It is noted, however, that this coating scheme can be used on practically any article, regardless of its shape, construction or the type of material making up the article's surface. Thus, the invention is not limited to just PC Cards. The depicted embodiment shows the external surface 22 of the back cover 20 as having a two-layer coating. The first, undercoat layer 24 is applied directly to the surface 22, and the second, overcoat layer 26 is applied over the undercoat. The undercoat layer 24 can cover the entire external surface of the cover 20, but need only cover the portion of the surface 22 that is going to be used to display the desired graphics and text. This layer 24 is shown as covering only a portion of the external surface 22 in FIG. 1. The overcoat layer 26 may just cover the extent of the undercoat layer 24 if desired. However, as shown in FIG. 1, the overcoat layer 26 can also be extended and employed as an outer coating for the entire back cover 20, as well as the undercoated region.

Figure 2A:
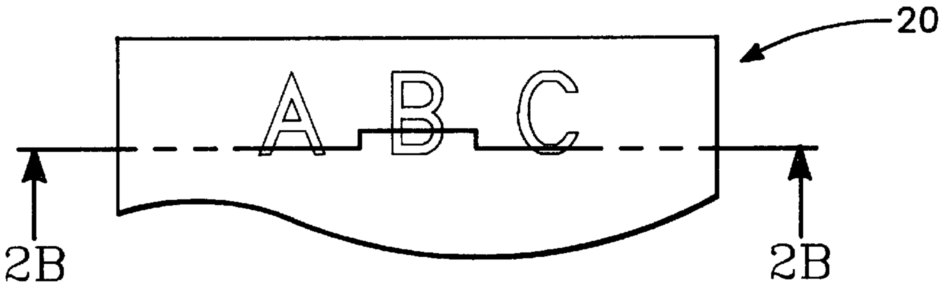
FIG. 2A is a view of the exterior of the cover of FIG. 1 subsequent to the etching of lettering into the coating scheme.
Figure 2B:
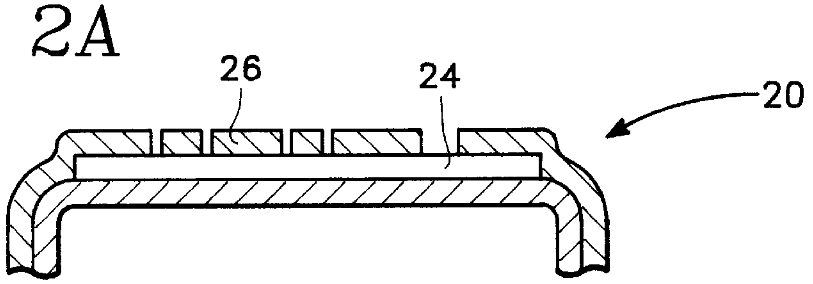
FIG. 2B is a cross-sectional view of the cover of FIG. 2A cut in the lateral direction through a portion of the lettering.
Figure 3:
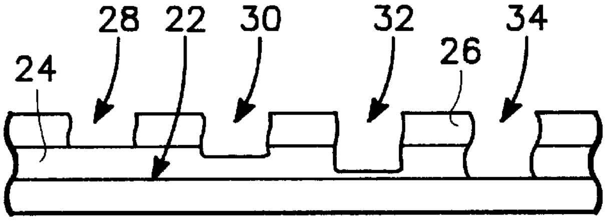
FIG. 3 is a cross-sectional view of a portion of the back cover of FIG. 1 subsequent to etching that shows three acceptable etch depths on the left and one potentially unacceptable etch depth on the far right.

FIGS. 2A and 2B show the back cover 20 of FIG. 1 after it has been etched. FIG. 2A is a top view of the cover 20 onto which the letters "ABC" have been etched as an example. FIG. 2B depicts the cross-section of the cover through the etched lettering. As can be seen, the portions of the overcoat layer 26 coinciding with the lettering have been removed by one of the laser etching processes described previously, and the undercoat layer 24 has been exposed in those areas. The etch should be deep enough to completely remove the overcoat layer 26 in the area of the lettering, but not so deep as to remove all of the undercoat layer 24 in the region thereby exposing the surface 22 of the cover. Referring to FIG. 3, it is not critical that all of the undercoat layer 24 in the region of the lettering remain intact as shown by etch groove 28. Rather, it is acceptable if some (as illustrated by etch groove 30), or even most (as illustrated by etch groove 32) of the depth of the undercoat layer is removed. However, as indicated above, the entire depth of the undercoat layer 24 should not be removed, as illustrated by etch groove 34, thereby exposing the surface 22 of the cover—at least not in a significant portion of the etched areas. While a complete removal of the undercoat layer 24 in a small portion of the etched areas may be acceptable, if too much of the cover's surface 22 is exposed, an unwanted loss of the desired level of contrast can result. Currently available laser etching devices are able to control the depth of the etch such that the entire overcoat layer is removed, without removing the entire depth of the undercoat layer, even for layers as thin as about 13–15 $\mu$m. For example, in a tested embodiment of this version of the invention, a laser etcher having the model name SIGNATURE and manufactured by Control Laser Corporation of Orlando, Fla. was successfully used to completely etch through a 13–15 $\mu$m thick overcoat layer, while leaving at least some of the depth of a 13–15 $\mu$m thick undercoat layer intact in substantially all the etched areas.

The undercoat layer 24 and overcoat layer 26 are differently colored to the extent that the contrast between the colors is sufficient to facilitate the readability of the desired graphics and text, as well as ensuring the scanability of any bar codes etched into cover 20. For example, in the tested embodiment the undercoat layer 24 was white in color and the overcoat layer 26 was dark gray (i.e. Pantone 424). It was found that this color scheme provided the necessary contrast. However, it is noted that the use of a dark color for the overcoat layer 26 to form the background and a light color for the undercoat layer 24 to form the graphics and text was an aesthetic choice. The color scheme could have been reversed such that the background color provided by the overcoat layer 26 would be light, while the color of the graphics and text imparted by the undercoat layer 24 would be dark. The same desired results can be obtained using either color scheme.

Figure 4:
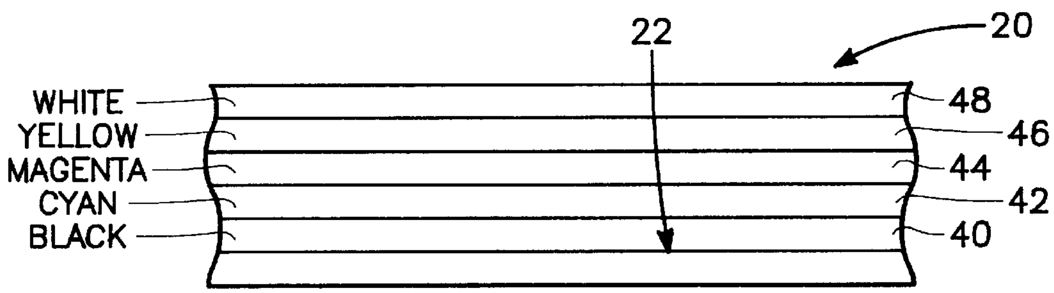
FIG. 4 is a cross-sectional view of a portion of a back cover of a PC Card incorporating a five-layer version of the coating scheme embodying the present invention prior to the etching of graphic and text elements into the coating scheme.

Up to this point, the described embodiments of the invention have involved a two-layer coating system capable of producing graphics and text of one color against a background of another, contrasting color. However, the invention is not limited to just these two-layer embodiments. It is also possible to produce graphics and text having varying colors and shades against a contrasting background color. Referring to FIG. 4, one version of this multi-color embodiment is accomplished by incorporating a system of five layers over the surface of an article, such as the previously-described back cover of a PC Card. In the depicted embodiment, the innermost layer 40, which is shown applied directly to the external surface 22 of the back cover 20 of a PC Card, is black. The subsequent layers 42, 44, 46, 48 in ascending order are colored cyan, magenta, yellow and white, respectively. Of course, it is not intended to limit the present invention to the five layers or the colors depicted in FIG. 4. Rather, any practical number of layers can be employed, with each having any color desired. In regards to the five-layer embodiment depicted in FIG. 4, the white layer 48 forms the outermost layer and consequently provides the background color to which the colors of the graphics and text will contrast. To create the desired graphics and text in one of the layer colors, the laser etching device is set to etch to a depth which removes the white layer material as well as any colored layer material overlying the desired color. For example, if the desired graphics and text is to be cyan colored, the etching depth is set so as to etch through the white, yellow and magenta layers 48, 46, 44 so as to expose the cyan layer 42. As with the etching process described previously, it is permissible for the etch depth to extend into the cyan layer 42, as long as it does not extend all the way through to the black layer 40 in any significant portion of the etched area—except when it is desired to darken the color of the graphics and text as will be discussed later in this description. Further, it is noted that the etch depth can be modified so that various portions of the graphics and text produced by the methods of the present invention have different colors. For example, one portion could be cyan, will other portions can exhibit any of the other layer colors, except the color of the outer, exposed layer (i.e. white in the depicted case). The order of the coating layers depicted in FIG. 4 can also be changed without significant effect. In addition, any of the coating layers could act as the outer background layer providing contrast to the colored graphics and text created during the etching process. For example, the black and white layers could be switched, thereby providing a dark background to colored or white graphics and text.

Figure 5A:
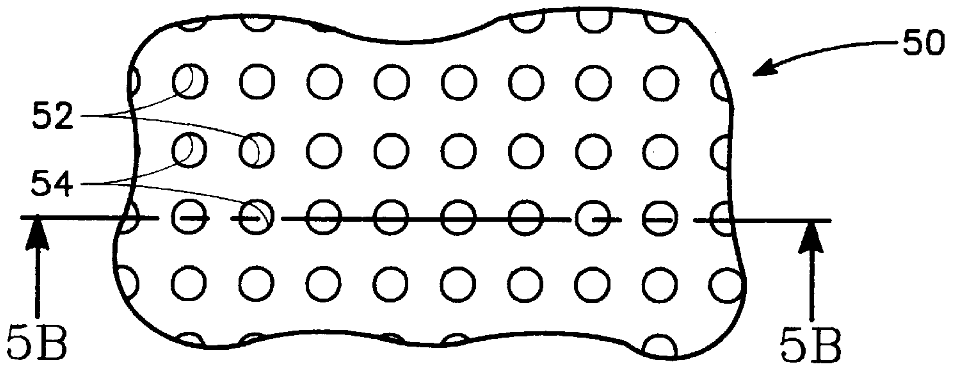
FIG. 5A is an enlarged view of the exterior of the cover of FIG. 4 showing a portion of the graphics and text etched into the coating scheme using an array of holes where adjacent holes in the array are etched to a different depth thereby alternately exhibiting either a yellow or cyan color so as to appear green.
Figure 5B:
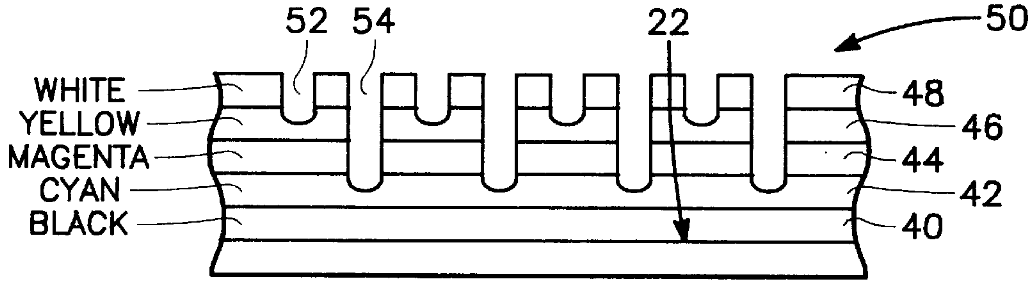
FIG. 5B is a cross-sectional view of the cover of FIG. 5A cut in the lateral direction through a row of the array of holes.

Although the present invention is not limited to the use of a pulse laser in the laser etching device, the embodiment that will now be described assumes such a pulse laser is employed. With a pulse laser, it is possible to etch discrete holes into the covering layers. Thus, by modifying the etch depth for adjacent holes it is possible for each hole to exhibit a different one of the underlying layer colors. This has particular advantage when the color scheme depicted in FIG. 4 is employed because the colors yellow, magenta and cyan represent primary colors that can be used in conjunction with the white and black to produce a wide variety of apparent colors. An apparent color refers to the color a viewer would see when the graphics and text are formed using an array of holes exhibiting a mixture of the layer colors. For example, the apparent color red can be produced by using holes exhibiting the colors yellow and magenta, the apparent color green can be produced using holes exhibiting yellow and cyan, and the apparent color blue can be produced using holes exhibiting magenta and cyan. Following known principals associated with color printing, if adjacent "pixels" or "dots" exhibit two alternating primary colors, then an observer would perceive the color of this group of adjacent pixels or dots to be one of the aforementioned apparent colors depending on which two primary colors are employed. In the case of the present invention, these pixels or dots are replaced with the etched holes. For example, FIGS. 5A & 5B illustrate a portion of the back cover 20 of a PC Card configured as shown in FIG. 4 where an array 50 of "yellow" holes 52 and "cyan" holes 54 have been etch in the alternating pattern described above. This etched pattern would appear green to an observer. It should be noted that the order of the primary color layers in FIG. 4 is arbitrary, and they can be formed in any order desired. It is further noted that in order to produce the apparent colors to a viewer, the size of the holes and the density of their grouping must also follow the aforementioned principals associated with color printing. Specifically, it is believed that holes having a diameter not exceeding about 0.005 inches and grouped with a density exceeding about 90,000 holes per square inch, will produce the apparent color effect.

Figure 6:
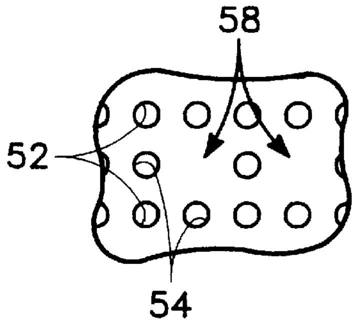
FIG. 6 is an enlarged view of the exterior of the portion of the cover of FIGS. 5A & 5B where some of the holes have been replaced by uniformly distributed non-etched areas exhibiting a white color, thereby making the apparent color a lighter shade of green.
Figure 7:
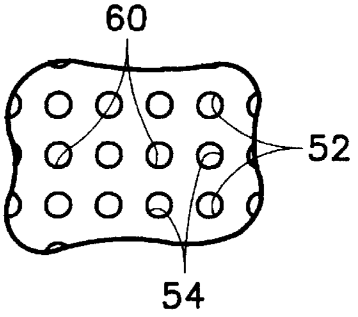
FIG. 7 is an enlarged view of the exterior of the portion of the cover of FIGS. 5A & 5B where some of the holes exhibiting the colors yellow or cyan have been replaced by uniformly distributed holes exhibiting a black color, thereby making the apparent color a darker shade of green.

It is also known that uniformly intermixing white pixels into an alternating array of two primary colors will lighten the shade of the resulting observed color, and that uniformly intermixing black pixels will darken the shade. The number of white or black pixels intermixed into the array will respectively determine how light or how dark the resulting observed color will appear. In the case of the present invention, the black or white areas can be formed in the array in two different ways. One way is to include a black or white layer, or both, as ones of the aforementioned underlying layers. If so, the black or white areas are formed by using the laser etching device to etches a hole in the coating layers down to the black or white layer, as appropriate. Alternatively, the overlying, exposed layer can be made to be either black or white. If so, the black or white areas, as the case may be, are formed by refraining from etching a hole into the layers at that spot in the array. In this latter approach, if both a black and white layer is desired to enable the graphic and text elements to be either darkened or lightened, respectively, a layer having the color not used as the outermost, exposed layer is made one of the underlying layers. For example, in the case of the multi-layered coating system depicted in FIGS. 5A & 5B, a white "pixel" 58 is created by refraining from etching that spot in the array (as shown in FIG. 6), whereas a black "pixel" 60 is created by etching through all the overlying layers 48, 46, 44, 42 to the black layer 40 in that location (as shown in FIG. 7).

Figure 8:
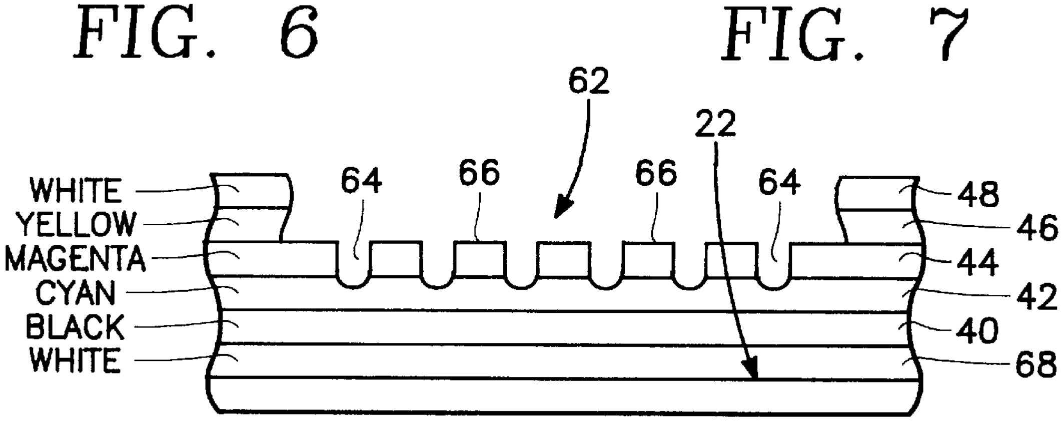
FIG. 8 is a cross-sectional view of the cover of FIG. 4 showing a portion of the graphics and text etched into the coating scheme where the material of the overlying white and yellow layers is completely removed and an array of holes is etched into the exposed magenta layer to form a pattern alternately exhibiting either magenta or cyan so as to appear blue.

While the above-described process is believed to be adequate for many applications, it is pointed out that the remaining un-etched areas of the outermost, exposed layer between the etched holes can affect the resulting apparent color imparted to the graphics and text. To avoid this effect, it is possible use the laser etching device to completely remove the material of the overlying, exposed layer, as well as any other layer covering the outermost of the primary color layers to be used in the previously-described alternating color pattern. Once the overlying layers are completely removed in the desired portion of the graphic and text elements, an array is formed by etching holes through the outermost primary color layer to the layer associated with the second of the primary colors to be combined. For example, the apparent color blue can be produced by creating an array exhibiting alternating colors of magenta and cyan. Referring to FIG. 8, this can be accomplished using the coating scheme of FIG. 4 as follows. The white and yellow layers 48, 46 are removed in an area 62 of the coating scheme where graphics and text are to be incorporated. This completely exposes the magenta layer 44 in this region 62. The required alternating pattern of the primary colors magenta and cyan is created by etching holes through the magenta layer 44 into the cyan layer 42 in spots corresponding to alternating locations of an array such as described in conjunction with FIG. 6A. Thus, the etched locations 64 in the array will exhibit a cyan color, while the non-etched locations 66 will exhibit a magenta color. Since there are no remaining portions of the layers 48, 46 previously overlying the magenta layer 44 in the area 62, the colors associated with the removed layer cannot affect the apparent color produced. Of course, if this alternative approach is used, any black layer 40 intended for darkening the shade of the apparent color, as well as any white layer 68 intended for lightening the apparent color, would have to be formed underneath the primary color layers, as shown in FIG. 8. Holes exhibiting the black or white color would be intermixed into the alternating primary color array as described previously by etching to the appropriate layer 40, 68 through the magenta and cyan layers 44, 42.

The coatings can be made of any materials commonly used for this purpose, such as paint or ink or the like, as long as they are of a type that can be etched quickly and efficiently by the laser etching device. Tested embodiments of the present invention were prepared using both paints and inks. The paints were applied via a spray process, whereas the inks were applied using a lithographic process. Both the painted embodiments and the inked embodiments were produced with two-layer coating schemes having layer thicknesses between about 13–15 $\mu$m. This thickness range is considered optimal for implementing the present invention. Layers having substantially larger thicknesses would work, however, the etching process would be slower and the resulting markings would have the look and feel of an engraving—something believed to be aesthetically undesirable. In addition, because it would take longer to cut through thick overlying layers, heat will tend to build up in the article being marked. This can result in damage to the article (e.g. warping, burning, etc.) should the built-up heat become excessive. Similarly, layers that are significantly thinner than the aforementioned optimal range may lack the opacity needed to provide a clear contrast to the outermost, exposed layer, or may allow the color of underlying layers to show through. It also becomes more difficult to ensure only the overlying layer material is removed while leaving at least some of the thickness of the underlying layer associated with the desired color intact, when excessively thin layers are employed. While, current laser etching devices provide remarkable precision in the etch depth, there are limits. Thus, the layer thickness should not be made less than the depth accuracy of the laser etching device employed.

Although, both the above-described paint and ink coatings produced acceptable results after being etched to incorporate graphics and text, the lithographically-applied ink coating scheme is more preferred as it is possible to better control the uniformity of the layer thicknesses over the entire surface of the article being marked. Maintaining uniformity in the layer thicknesses is important to the successful implementation of the present invention as the etch depths have to be precisely controlled to ensure all the material in overlying layers is completely removed, thereby exposing the layer having the color desired for the graphics and text.

While the invention has been described in detail by reference to the preferred embodiment described above, it is understood that variations and modifications thereof may be made without departing from the true spirit and scope of the invention. For example, the addition of an exterior layer made of a transparent, protective material would be acceptable. Such a layer is commonly used to protect the paint or ink covering a surface. In the present context, the transparent outer coat would protect the underlying colored layers. The graphic and text elements can be formed as described previously, with the exception that the laser beam of the laser etcher would also etch through the transparent outer layer during the marking process. Similarly, the addition of an primer coat layer under the colored layers is also acceptable. Such under coat layers are often used to provide an interface between the surface of an article and paint or ink layers to, for example, improve adhesion or prevent chemical interaction.

Wherefore, what is claimed is:

1. A system for incorporating graphic and text elements on a surface of an article, comprising:

a coating having a plurality of layers of material covering the surface of the article upon which the graphic and text elements are to be incorporated, said layers comprising an outermost, exposed layer, and at least two underlying layers formed of materials having a color different from one another; and an ablative etching device capable of etching the graphic and text elements into the at least two layers of material to a depth that completely removes the material of the outermost, exposed layer in substantially all areas etched but which leaves intact at least a portion of the thickness of an underlying layer in substantially all the etched areas; and wherein the ablative etching device etches an array of individual holes into the layers to form the graphic and text elements, wherein each hole is etched to a depth that results in the hole exhibiting a color corresponding to the color of the particular layer to which or into which the hole extends;

at least one of said plurality of layers has a color that makes the colors exhibited by the array of holes appear one of (i) lighter or (ii) darker to a viewer.

2. The system of claim 1, wherein material forming the outermost, exposed layer has a color that contrasts that of all underlying layers to the extent that the graphic and text elements are readily readable.

3. The system of claim 1, wherein the graphic elements comprise optically scanable bar codes, and wherein material forming the outermost, exposed layer has a color that contrasts that of all underlying layers to the extent that the bar codes can be accurately scanned.

4. The system of claim 1, wherein the ablative etching device comprises a laser etching device that etches the graphic and text elements into the at least two layers of material using a laser beam.

5. The system of claim 1, wherein each underlying layer is formed of a material having a different color.

6. The system of claim 1 wherein the material respectively forming each layer is one of (i) paint, or (ii) ink.

7. The system of claim 1 wherein the thickness of each layer is within a range of about 13 to 15 $\mu$m.

8. The system of claim 1 wherein the material respectively forming each layer comprises ink applied using a lithographic process.

9. The system of claim 1, wherein the outermost, exposed layer extends beyond the surface of the article upon which the graphic and text elements are to be incorporated so as to coat at least an additional portion of the article.

10. The system of claim 1, wherein at least two of the at least two underlying layers comprise material that imparts a different primary color to those layers.

11. The system of claim 10, wherein the holes in the array are sized so as to have a diameter not exceeding about 0.005 inches and are grouped in a density of no less than about 90,000 holes per square inch in the etched regions of the layers, thereby causing the graphic and text elements to seem to a viewer as having an apparent color different from the colors exhibited by adjacent holes of the array.

12. The system of claim 11, wherein the primary colors are selected from a group comprising yellow, magenta, and cyan, such that adjacent holes in the array exhibiting the colors yellow and magenta, respectively, will appear to a viewer as red, adjacent holes in the array exhibiting the colors yellow and cyan, respectively, will appear to a viewer as green, and adjacent holes in the array exhibiting the colors magenta and cyan, respectively, will appear to a viewer as blue.

13. The system of claim 11, wherein the outermost, exposed layer is made of a material that gives the layer a white color, and wherein the shade of the apparent color in at least a portion of the etched areas is lightened by causing the ablative etching device to refrain from etching into the layers at uniformly intermixed areas throughout the array in the portion of the etched areas to be lightened in shade, said intermixed non-etched areas having a size approximately equal to a cross-sectional diameter of the holes.

14. The system of claim 13, wherein a density of the uniformly intermixed non-etched areas is determinative of the degree to which the shade of the apparent color is lightened in that the higher the density, the lighter the shade.

15. The system of claim 11, wherein the outermost, exposed layer is made of a material that gives the layer a black color, and wherein the shade of the apparent color is darkened by causing the ablative etching device to refrain from etching into the layers at uniformly intermixed areas throughout the array in the portion of the etched areas to be darkened in shade, said intermixed non-etched areas having a size approximately equal to a cross-sectional diameter of the holes.

16. The system of claim 15, wherein a density of the uniformly intermixed non-etched areas is determinative of the degree to which the shade of the apparent color is darkened in that the higher the density, the darker the shade.

17. The system of claim 11, wherein one of the underlying layers is made of a material that gives the layer a black color, and wherein the shade of the apparent color in at least a portion of the etched areas is darkened by using the ablative etching device to uniformly intermix holes extending to or into the underlying layer having a black color throughout the array in the portion of the etched areas to be darkened in shade.

18. The system of claim 17, wherein a density of the uniformly intermixed holes extending to or into the underlying layer having the black color is determinative of the degree to which the shade of the apparent color is darkened in that the higher the density, the darker the shade.

19. The system of claim 11, wherein one of the underlying layers is made of a material that gives the layer a white color, and wherein the shade of the apparent color in at least a portion of the etched areas is lightened by using the ablative etching device to uniformly intermix holes extending to or into the underlying layer having a white color throughout the array in the portion of the etched areas to be lightened in shade.

20. The system of claim 19, wherein a density of the uniformly intermixed holes extending to or into the underlying layer having the white color is determinative of the degree to which the shade of the apparent color is lightened in that the higher the density, the lighter the shade.

21. A method of incorporating graphic and text elements on a surface of an article, comprising the steps of:

coating the surface of the article upon which the graphic and text elements are to be incorporated, said coating having a plurality of layers of material comprising an outermost, exposed layer, and at least two underlying layers formed of materials having a different color from one another; and etching the graphic and text elements into the layers of material using an ablative etching device to form an array of individual holes etched into the layers, wherein each hole is etched to a depth that results in the hole exhibiting a color corresponding to the color of the particular layer to which or into which the hole extends, and wherein at least one of said pluarlity of layers has a color that makes the colors exhibited by the array of holes appear one of (i) lighter or (ii) darker to a viewer.

22. The method of claim 21, wherein material forming the outermost, exposed layer has a color that contrasts that of all underlying layers to the extent that the graphic and text elements are readily readable.

23. The method of claim 21, wherein the graphic elements comprise optically scanable bar codes, and wherein material forming the outermost, exposed layer has a color that contrasts that of all underlying layers to the extent that the bar codes can be accurately scanned.

24. The method of claim 18, wherein at least two of the underlying layers comprises material that imparts a different primary color to that layer.

25. The method of claim 4, wherein the holes in the array are sized so as to have a diameter not exceeding about 0.005 inches and are grouped in a density of no less than about 90,000 holes per square inch in the etched regions of the layers, thereby causing the graphic and text elements to seem to a viewer as having an apparent color different from the colors exhibited by adjacent holes of the array.

26. The method of claim 25, wherein the primary colors are selected from a group comprising yellow, magenta, and cyan, such that adjacent holes in the array exhibiting the colors yellow and magenta, respectively, will appear to a viewer as red, adjacent holes in the array exhibiting the colors yellow and cyan, respectively, will appear to a viewer as green, and adjacent holes in the array exhibiting the colors magenta and cyan, respectively, will appear to a viewer as blue.

27. The method of claim 25, wherein the outermost, exposed layer is made of a material that gives the layer a white color, and wherein the shade of the apparent color in at least a portion of the etched areas is lightened by a step of uniformly intermixing non-etched areas having a size approximately equal to a cross-sectional diameter of the holes throughout the portion of the etched areas to be lightened in shade.

28. The method of claim 27, wherein a density of the uniformly intermixed non-etched areas is determinative of the degree to which the shade of the apparent color is lightened in that the higher the density, the lighter the shade.

29. The method of claim 25, wherein the outermost, exposed layer is made of a material that gives the layer a black color, and wherein the shade of the apparent color is darkened by a step of uniformly intermixing non-etched areas having a size approximately equal to a cross-sectional diameter of the holes throughout a portion of the array to be darkened in shade.

30. The method of claim 29, wherein a density of the uniformly intermixed non-etched areas is determinative of the degree to which the shade of the apparent color is darkened in that the higher the density, the darker the shade.

31. The method of claim 25, wherein one of the underlying layers is made of a material that gives the layer a black color, and wherein the shade of the apparent color in at least a portion of the etched areas is darkened by a step of uniformly intermixing holes extending to or into the underlying layer having a black color throughout the portion of the etched areas to be darkened in shade.

32. The method of claim 31, wherein a density of the uniformly intermixed holes extending to or into the underlying layer having the black color is determinative of the degree to which the shade of the apparent color is darkened in that the higher the density, the darker the shade.

33. The method of claim 25, wherein one of the underlying layers is made of a material that gives the layer a white color, and wherein the shade of the apparent color in at least a portion of the etched areas is lightened by a step of uniformly intermixing holes extending to or into the underlying layer having a white color throughout the portion of the etched areas to be lightened in shade.

34. The method of claim 33, wherein a density of the uniformly intermixed holes extending to or into the underlying layer having the white color is determinative of the degree to which the shade of the apparent color is lightened in that the higher the density, the lighter the shade.

* * * * *